Figure 4:
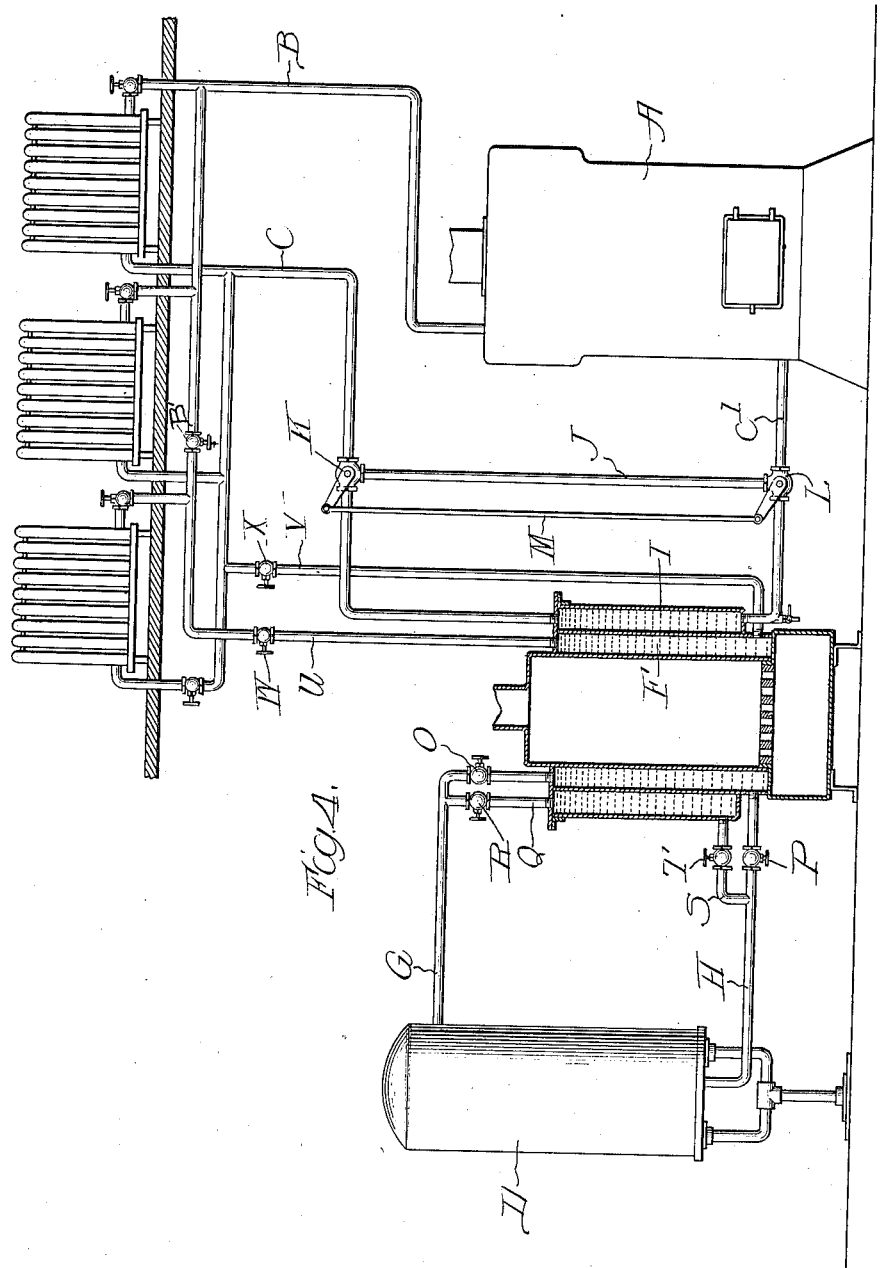

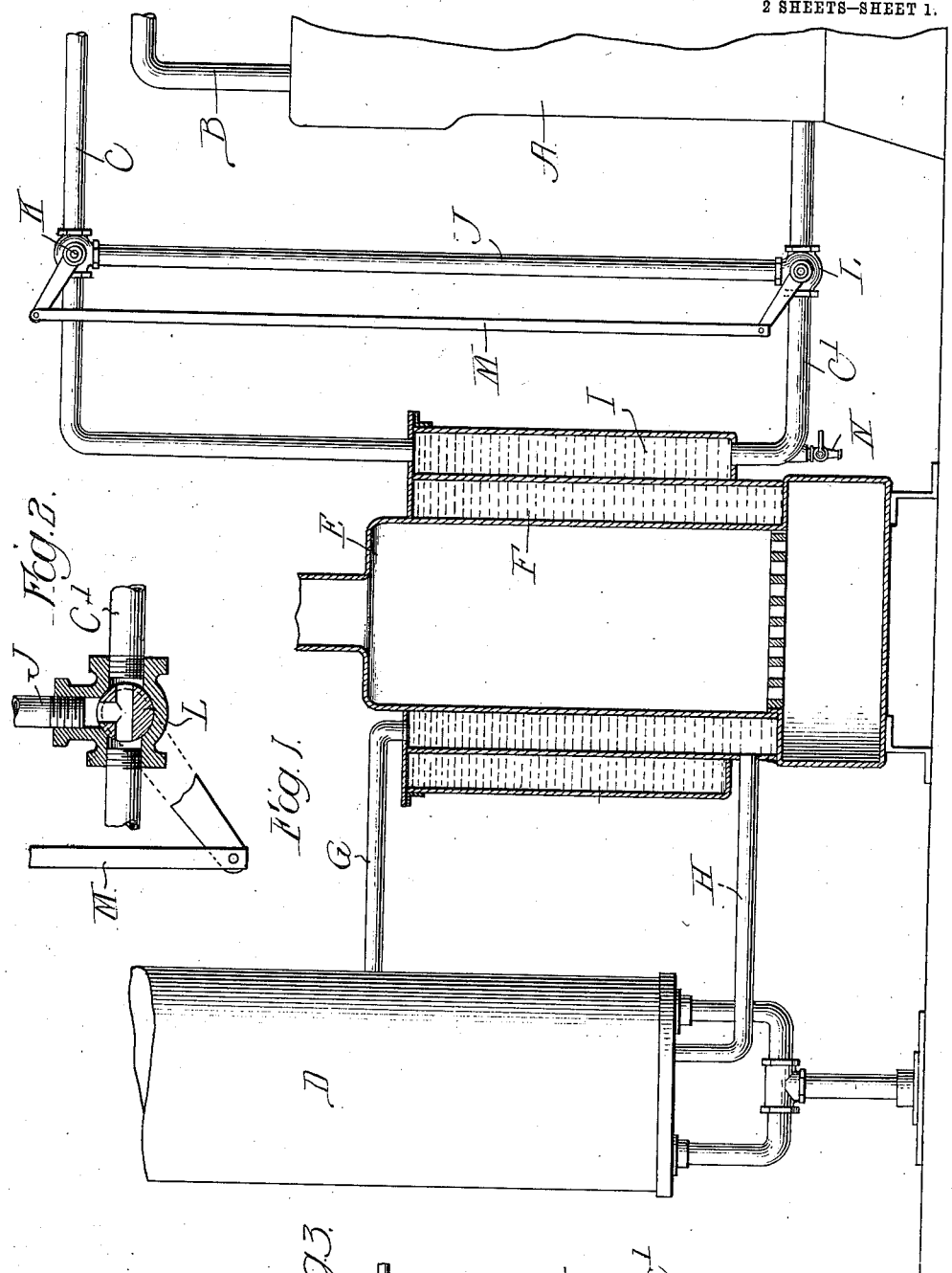

W. H. JONES.
WATER HEATER.
APPLICATION FILED FEB. 26, 1910.

1,029,300.

Patented June 11, 1912.

2 SHEETS—SHEET 2.

Witnesses:
Robert H. Weir
Louis B. Erwin

Inventor:
William H. Jones
By Rector, Hibben & Davis
His Att'ys.

UNITED STATES PATENT OFFICE.

WILLIAM HENRY JONES, OF CHICAGO, ILLINOIS.

WATER-HEATER.

1,029,300.  Specification of Letters Patent.  Patented June 11, 1912.

Application filed February 26, 1910. Serial No. 546,182.

*To all whom it may concern:*

Be it known that I, WILLIAM H. JONES, a citizen of the United States, residing at Chicago, Cook county, Illinois, have invented certain new and useful Improvements in Water-Heaters, of which the following is a description.

My invention relates to a water heater for maintaining a supply of hot water in a hot water tank, from which it may be piped to wash basins, bath tubs or any desired fixtures in buildings in the usual and well known manner, adapted and arranged so that the water may be heated alternatively either by the return pipe of a main heating apparatus by which the building is, or may be, warmed; or by a combustion chamber provided for such purpose in the heater; or by both means together.

The object of my invention is to provide a simple and efficient form and arrangement of such a tank heater and a main heating apparatus attaining advantages of economy and convenience not heretofore realized. From my construction and arrangement, as hereinafter described, it results that the hot water from the heating apparatus used for heating a building will keep up the supply of hot water in the hot water tank during the night, utilizing heat that would otherwise be wasted, and that when there is a very hot fire in the combustion chamber of the heater by means of which the water in the tank is heated, such tank heater will serve as an auxiliary to the main heating apparatus used for heating the building, and at the same time the return current of water in such heating apparatus will prevent the water in the tank heater, and consequently in the tank, from becoming super-heated. These and other advantages hereinafter mentioned I have attained by the construction, arrangement and combination of parts illustrated in the accompanying drawings, which exhibit a preferred form of my invention.

In the drawings Figure 1 shows a view, partly broken away and partly in section of a heating apparatus, tank heater, tank and connections; Fig. 2 is a section of the three-way valve L; Fig. 3 is a modified arrangement of valves for directing the return flow of water in the heating apparatus alternatively through the pipe J or the tank heater; and Fig. 4 is a modified arrangement of pipe connections for purposes which are hereinafter fully described.

The main heating and radiating apparatus may be of any ordinary or suitable construction and adapted to heat the building either by circulation of steam or a current of hot water. In either case the outlet pipe B leads to the radiators of the apartments to be warmed, thence by way of the upper return pipe C, a heating passage in the tank heater to be hereinafter described, and a lower portion C' of the return pipe back to the heating coils or boiler of the main heating apparatus. The lower parts of the return circuit, including the heating passage in the tank heater, the lower portion C' of the return pipe, and a part of the upper portion are filled with water, either water of condensation if the apparatus be a steam heating system, or water which has been more or less cooled by passage through the radiating apparatus if the system be a water heating system. In either case the specific arrangement and construction of the heating means and the circulating passages through the radiating apparatus form no part of my present invention and need not be particularly described.

The hot water tank D may be of any ordinary or suitable construction and is provided with the usual connections to the water mains supplying water under pressure and to pipes for conducting the hot water to the fixtures which it supplies. The tank or auxiliary heater for maintaining a supply of hot water in the tank is provided with a furnace for burning fuel comprising the usual grate and ash-box, and a combustion chamber E, around which is arranged a water heating passage which in the present instance consists of the annular water chamber F, connected at the top and bottom, respectively, with the outlet or hot water pipe G, and the return pipe H, leading into the upper and lower portions of the hot water tank. Adjacent the water chamber F is a second passage consisting of the water chamber I surrounding such chamber F, which at its top is connected with the return pipe C of the heating apparatus A and at its bottom is connected with the lower portion C' of the return pipe. A pipe J leads from the upper return pipe C to the lower portion of the return C', and in the present instance a three-way valve K located at the upper end of said pipe J and provided with an operating lever is arranged to alternately direct the return through the water chamber I, or the pipe J, while a similar three-way valve L at the lower end of said pipe alternately connects the inner end of the portion C' of the return pipe with either the water chamber I or the pipe J. An operating rod M connecting the levers of the valves enables them to be shifted simultaneously, to cut out the heating water chamber I from the return pipes of the main heating system, or open such return connection through it. However, as illustrated in Fig. 3, it is obvious that I may use three ordinary shut-off valves, one in the pipe J, one in the return pipe C, and one in the portion C' of the return pipe, each of the latter intermediate the adjacent end of the pipe J and the water chamber I, which by proper adjustment will serve the same purpose as the two three-way valves.

Inasmuch as it is usual in large apartment buildings to use an independent heater, burning anthracite coal, to heat the water in the water tank, while by my invention I am able, especially during moderate weather, to heat the water sufficiently through heat derived from the return flow in the main system, which usually burns a much cheaper fuel, it is evident that I effect a material economy of operation. On the other hand if the weather is extremely cold a hot fire in the tank heater will heat the water in the water chamber F to a high temperature, and this in turn will raise the temperature of the return current of the heating apparatus in the water chamber I (though not sufficiently to reverse the direction of flow), and the tank heater will thus serve as an auxiliary to the main heating system. Incidentally, the return flow of the main system through the chamber I, in absorbing heat from the water in the chamber F, will prevent such water from becoming super-heated. Since I may thus use the tank heater as an auxiliary to the main heating system in the emergency of unusually cold weather, I am able to use a smaller main heater than would otherwise be necessary.

During the summer season, when the heating apparatus is not in operation, or whenever necessary for repairs or other reasons, the valves K and L may be turned to establish the return connection of the heating apparatus through the pipe J, and the water in the chamber I and connected portions of the pipe C and C' may be drained off by means of a drain cock N, which is provided for the purpose.

While the construction and arrangement thus far described possesses the advantages before mentioned, I have in Fig. 4 illustrated a modified form or arrangement of my invention still further extending the field of its utility. As there illustrated the hot water pipe G is provided with the shut-off valve O, and the return pipe H with a similar valve P. The upper end of the outer water chamber I is connected with the pipe G by a pipe Q, provided with a shut-off valve R, while the lower end is similarly connected with the pipe H by the pipe S, provided with the shut-off valve T. The inner water chamber F has at its upper end an outlet pipe U leading to radiating apparatus hereinafter mentioned, and a return pipe V leading from such apparatus, provided respectively with the shut-off valves W and X. The radiating apparatus to which the pipes U and V are connected may be independent apparatus in a separate room or building, or in a single room or apartment of the building heated by the main heating apparatus, or in the latter case the radiating apparatus of the main system may be used, suitable valves being provided to shut off connection through the radiator of the flow in the main system.

Supposing it to be desired to close the main part of a large building arranged to be heated by the main heating system, while keeping warm a single room or apartment occupied by a care-taker or housekeeper, and heated by the radiating apparatus connected with the pipes U and V, the valves K and L are operated to shut off connection of the chamber I with the main heating system, the valves W and X opened to establish connection between the chamber F and the radiating apparatus to which the pipes U and V are connected, and the valve B' in the branch of the supply pipe which leads to said radiating apparatus is closed. The valves O and P are closed and the valves R and T opened, to cut off the circulation of water between the hot water tank and the chamber F, and establish such a circulation through the chamber I. The fire of the main heating system may now be allowed to die out, and a fire in the auxiliary heater alone will then serve to heat the single room or apartment, and also maintain a supply of hot water in the hot water tank D.

It is of course obvious that what has in the foregoing description been considered as a tank heater or a supplementary heater may be used by itself as a heater for heating a small building, or any other space within its capacity, the heated fluid pipe U and return pipe V being connected to the radiating apparatus, and the chamber I of the heater not being connected with any other heating apparatus. When the heater is not needed in connection with the radiating apparatus for warming the building in which it is installed, the chamber F may be placed in circulating connection with the hot water tank in the manner heretofore described, and the heater used simply to maintain a supply of hot water in the tank.

While I have described the pipes G and H as attached to the tank D and designed to maintain a supply of hot water to be piped to any desired fixtures throughout a building, it is evident that the circulation through one or the other of the water chambers F and I and such pipes may be adapted to be used for other heating purposes in various ways. For convenience of description I have also described the water chambers F and I as annular in form but their precise geometrical shape is not material, and the outer chamber may only partially surround the inner.

The location of the water-heating chamber F of the secondary or tank heater in heat-conductive relation with the return passage of the main heating system possesses important advantages as compared with placing it in such relation with the outflow passage, or other location than the return. In the first place, the greatest efficiency of the radiating apparatus is attained, as none of the heat is lost on its way to it; and, in the second place, the water in the chamber F absorbs the heat of the water in the return passage of the main heating system, which last mentioned water is therefore cooled to a much greater degree than it would otherwise be, and the flow in the main heating system is thereby stimulated, while the heat abstracted is utilized in the secondary system to bring a supply of cold water to a moderate but satisfactory degree of warmth. In other words, the arrangement results in a greater difference in temperature between the outflow and inflow connections of the main heater, and consequently in a greater absorption and distribution of heat units than any other, and the heat is distributed in the most advantageous manner.

I claim:

1. The combination of a main heating apparatus including a radiator and having circulating passages for heated fluid including a return passage from said radiator, a secondary heater having independent circulating passages including a water-heating chamber in heat-conductive relation with said return passage in the main heating apparatus, and a combustion chamber arranged to independently heat said water-heating chamber of the secondary heater.

2. The combination, with heating apparatus including a radiator and having circulating connections including a return pipe from said radiator, and with a hot water tank, of a water heater having a combustion chamber and a water-heating passage connected at top and bottom with said tank and also having a second passage in heat-conductive relation with said first-mentioned passage, said second passage being interposed in the return pipe of said heating apparatus.

3. The combination, with hot water heating apparatus including a radiator and having circulating connections including a return pipe from said radiator, and with a hot water tank, of a water heater having a combustion chamber and a water-heating chamber surrounding said combustion chamber and connected at top and bottom with said tank and also having a second water chamber surrounding and in heat-conductive relation with said first-mentioned chamber, said second chamber being interposed in the return pipe of said heating apparatus.

4. The combination, with a hot water tank, and with a heater having a chamber for heating the water in said tank provided at its top and bottom portions with circulating connections with said tank and also having a second chamber in heat-conductive relation with said first-mentioned chamber; of a heating apparatus having circulating connections including a return pipe with an upper portion C communicating with the top of said second chamber, a lower portion C' communicating with the bottom thereof, a pipe connecting said upper and lower portions of the return pipe, and means for alternatively directing the flow through said second chamber or through said connecting pipe.

5. The combination, with a hot water tank, and with a heater having a combustion chamber, a heating chamber surrounding said combustion chamber provided at its top and bottom portions with circulating connections with said tank, and a second chamber surrounding and in heat-conductive relation with said first-mentioned chamber; of a heating apparatus having circulating connections including a return pipe with an upper portion communicating with the top of said second chamber, a lower portion communicating with the bottom thereof, a pipe connecting said upper and lower portions, a three-way valve at each end of said connecting pipe, and an operating rod for simultaneously shifting said three-way valve.

6. The combination of a main heating apparatus including a radiator and having circulating passages for heated fluid including a return pipe from said radiator, a secondary heater having an annular chamber interposed in such return pipe and a second annular chamber arranged concentrically within and in heat-conductive relation with said first-mentioned chamber and also having a combustion chamber within said second chamber, and a water tank having circulating pipes connected at top and bottom with said second chamber of the heater.

7. In heating systems, the combination of a main heating apparatus including radiating apparatus having circulating passages for the flow of heated fluid including a return pipe, a secondary heater having an annular chamber interposed in such return pipe, and a second annular chamber concentrically arranged within and in heat-conductive relation with said first-mentioned chamber and also having a combustion chamber arranged within said second chamber, a hot water tank and circulating pipes adapted to connect the same with each of said annular chambers, circulating pipes adapted to connect the radiating apparatus with said second mentioned annular chamber, means for cutting such last-mentioned circulating pipes in and out at will, means for cutting in and out at will the passage for the return flow from said main heating apparatus through said first-mentioned annular chamber, and means for opening and closing the connections between said hot water tank and said two annular chambers to connect said tank with one or the other at will.

8. In heating systems, the combination of a main heating apparatus including radiating apparatus having circulating passages for the flow of heated fluid including a return pipe, a secondary heater having an annular chamber interposed in such return pipe and a second annular chamber concentrically arranged within and in heat-conductive relation with said first-mentioned chamber and also having a combustion chamber arranged within said second chamber, a hot water tank and upper and lower circulating pipes having valve-governed branches arranged to be placed in communication with either of said chambers at will, and circulating pipes adapted to connect the radiating apparatus with said second-mentioned annular chamber, valves for governing the circulation through such last-mentioned circulating pipes and radiating apparatus, and valves for governing the return flow from said main heating apparatus through said first-mentioned chamber.

9. In combination with radiating apparatus and with a hot water tank provided with upper and lower circulating pipes in communication therewith; a water heater having a combustion chamber, an annular fluid heating chamber surrounding said combustion chamber and in circulating connection with said radiating apparatus, and a second annular chamber surrounding and in heat-conductive relation with said first-mentioned chamber, said upper and lower circulating pipes having valve-governed branches communicating respectively with said annular chambers whereby they may be placed in circulating connection with either of said annular chambers at will; and means for cutting off the circulating connection between said first-mentioned chamber and the radiating apparatus.

10. In combination with radiating apparatus and with a hot water tank provided with upper and lower circulating pipes, a water heater having a combustion chamber, a fluid-heating chamber arranged to be heated thereby and having valve-governed circulating communication with said radiating apparatus, and a second chamber in heat-conductive relation with said fluid-heating chamber, said upper and lower circulating pipes having valve-governed branches communicating respectively with said fluid heat chamber and said second chamber whereby they may be placed in communication with either of said chambers at will.

WILLIAM HENRY JONES.

Witnesses:
 LOUIS B. ERWIN,
 ROBERT H. DOBBERMAN.